(12) United States Patent
Olstad et al.

(10) Patent No.: US 6,868,360 B1
(45) Date of Patent: Mar. 15, 2005

(54) SMALL HEAD-MOUNTED COMPASS SYSTEM WITH OPTICAL DISPLAY

(75) Inventors: William D. Olstad, Panama City, FL (US); Dennis G. Gallagher, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/699,426

(22) Filed: Nov. 3, 2003

(51) Int. Cl.[7] ............................................... G01C 17/00
(52) U.S. Cl. ........................... 702/150; 702/92; 702/93; 702/95
(58) Field of Search .............................. 702/92, 93, 94, 702/95, 150, 151, 152, 153, 155; 367/131, 910; 248/179.1, 661

(56) References Cited

U.S. PATENT DOCUMENTS 4,318,522 A * 3/1982 Appleberry .............. 248/179.1

6,181,644 B1 * 1/2001 Gallagher .................... 367/131

* cited by examiner

Primary Examiner—Bryan Bui
(74) Attorney, Agent, or Firm—James T. Shepherd

(57) ABSTRACT

A system and method indicate the direction faced by an operator. A waterproof housing has a mounting mechanism to engage a part of a headgear worn by an operator to position the housing in a portion of the operator's forward field of view. A two-axis gimbal mechanism is inside the waterproof housing and has a protective housing connected to the waterproof housing. The protective housing contains ring structure coupled to two orthogonal axis structures. A magnetic field sensor module is mounted on one of the axis structures and provides magnetic field data signals representative of the direction faced by the operator. An optical element has a wide field of view to transmit compass data images representative of the magnetic field data signals to the eyes of the operator.

15 Claims, 3 Drawing Sheets

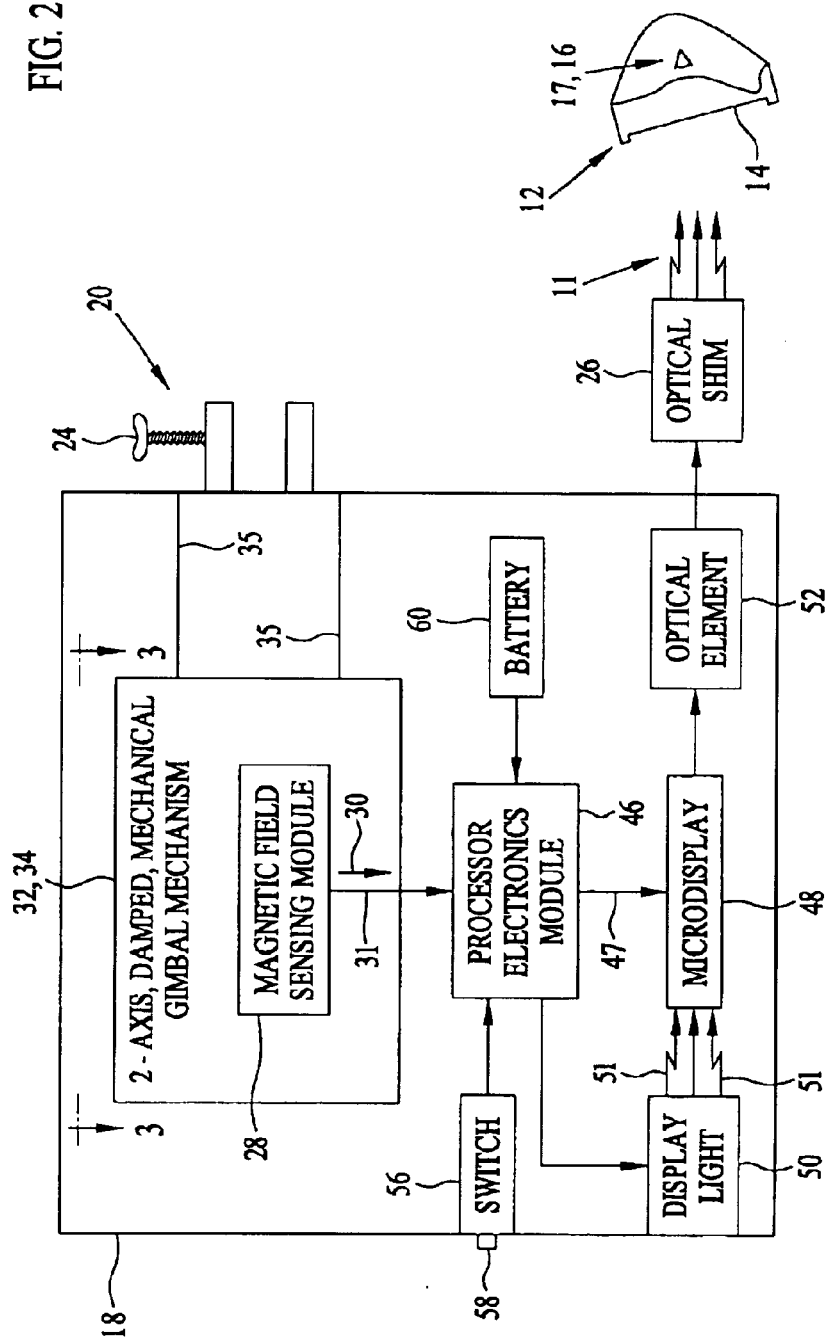

SMALL HEAD-MOUNTED COMPASS SYSTEM WITH OPTICAL DISPLAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a system to displaying data to personnel under conditions that impair vision. More particularly, this invention relates to a system externally mounted on a variety of existing headgear (i.e. dive masks, goggles, firefighting masks, helmets, head straps etc.) to allow a wearer to see real-time presentations of compass data.

Successful completion of tasks in visually and physically challenging environments often requires navigation from one point to another. For example, US Navy SEAL and Marine Combat divers are required to take surface compass bearings and swim thousands of yards underwater to reach a target area with a good degree of accuracy. Currently, they use analog floating card compasses with luminous markings that are mounted on hand-held navigation boards. These hand-held navigational aids do not always come up to expectations since they can be very difficult to see in highly turbid, zero visibility conditions. If the compass data can be seen at all, it takes extremely high levels of concentration to maintain a nearly level compass attitude with visual contact with the compass, and stay on course. This fatigues the operator, is a distraction from other potentially important tasks, and can result in inefficient and possibly unsafe operations.

Firefighters or other nighttime operators also may face situations of impaired vision due to conditions of smoke and/or darkness in their application environment. Often overcoming the distraction of safely getting from one place to another can compromise effectiveness.

Thus, in accordance with this inventive concept, a need has been recognized in the state of the art for a system providing continuous, hands-free, access to compass data in all visibility conditions and not constraining an operator's body position to keep a compass sensor at a nearly level attitude to enable effective, safe completion of a mission.

OBJECTS AND SUMMARY OF THE INVENTION

An object of the invention is to provide a module for providing compass information in all conditions of visibility.

Another object of the invention is to provide a module for providing directional information that does not require a wearer to maintain a predetermined physical attitude.

Another objective is to provide a small, self-contained, waterproof and ruggedized module that allows an operator to see directional data in any environment.

Another object of the invention is to provide a compact and rugged module that can be used stand-alone with it's own head mounted bracket, attached to existing head mounted hardware or be hand-held to allow unimpeded observation of directional data in any environment.

Another object of the invention is to provide a compact optical design and mounting methods to place a compass module in various positions in an operator's field of view.

Another object of the invention is to provide a module for viewing compass data that does not require hand manipulations by the operator to visually acquire the compass sensor data after the module has been mounted to the head and the optics have been aligned.

Another object of the invention is to provide a module for viewing compass data that is mechanically gimbaled and damped and has a two-axis compass sensor to provide stable compass data over a large range of pitch and roll by an operator during navigation.

Another object of the invention is to provide a module for viewing compass data that includes the ability to electronically calibrate the compass sensor, correct for local static magnetic disturbances in the operating area, and to correct for magnetic declination angle depending on what part of the world it is being used in.

These and other objects of the invention will become more readily apparent from the ensuing specification when taken in conjunction with the appended claims.

Accordingly, the present invention is for a system and method to indicate the direction faced by an operator. A waterproof housing has a mounting mechanism to engage a part of a headgear worn by an operator to position the housing in a portion of the operator's forward field of view. A two-axis gimbal mechanism is inside the waterproof housing and has a protective housing connected to the waterproof housing. The protective housing contains ring structure coupled to two orthogonal axis structures. A magnetic field sensor module is mounted on one of the axis structures and provides magnetic field data signals representative of the direction faced by the operator. A processor electronics module is connected to the magnetic field sensor module to receive the magnetic field data signals and create representative driving signals. A microdisplay is connected to the processor electronics module for displaying the driving signals, and a display light inside of the waterproof housing radiates light onto or through the microdisplay. An optical element is aligned to receive illumination through the microdisplay and transmit undistorted and focused compass data images representative of the magnetic field data signals to the eyes of the operator.

BRIEF DESCRIPTION OF THE DRAWINGS

FIG. 2 is a block diagram of the compass system of the invention.

DESCRIPTION OF THE PREFERRED EMBODIMENTS

Figure 1:
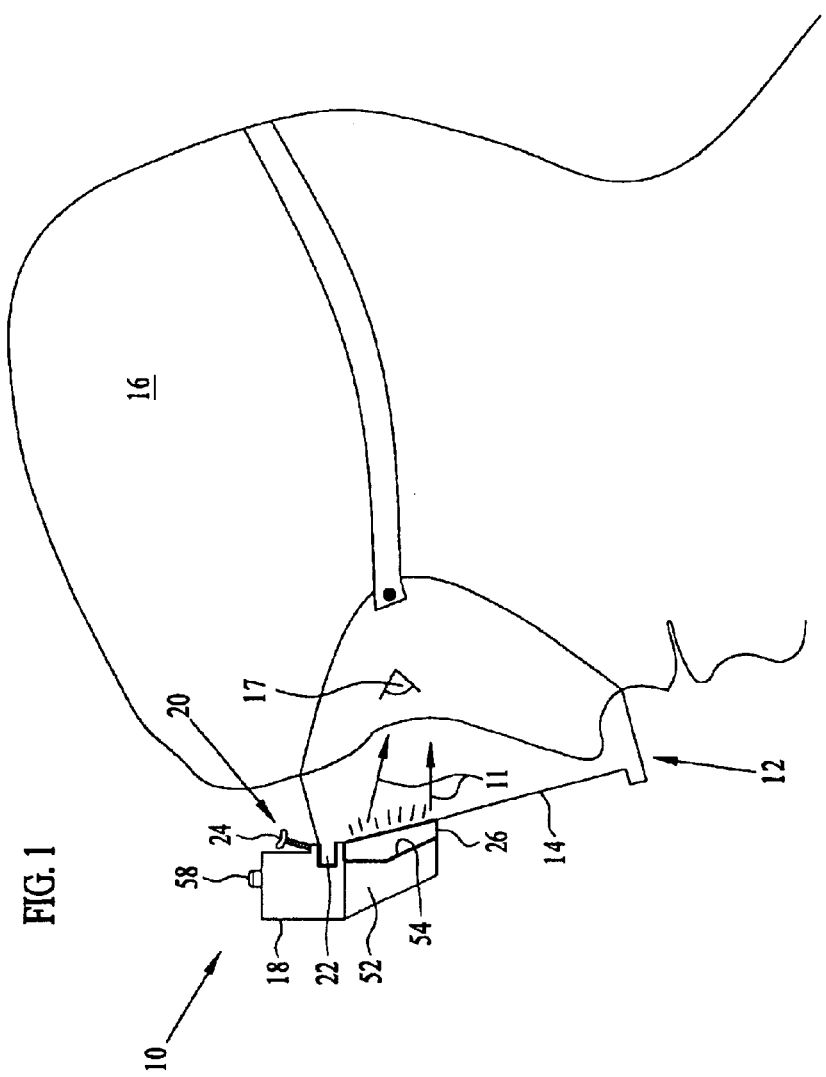
FIG. 1 is a schematic side view of the compass system of the invention mounted on head mounted hardware such as a diving face mask.

Referring to FIG. 1, head mounted compass system 10 of the invention is for displaying compass data images 11 of compass data and is schematically shown mounted on head mounted hardware 12. Head mounted hardware 12 can include diving facemasks (as depicted), goggles, firefighting masks, helmets, etc. that have a view-port lens 14 and stand-alone head strap and bracket assemblies. Compass system 10 allows an operator 16 (i.e. diver, firefighter, etc.) to clearly see alphanumeric compass data as compass data images 11 through lens 14 as well as navigate in visually challenging environments (i.e. in darkness, turbid water, smoke, fog, other obscurants or eye irritants) where the hands cannot be used to hold a standard navigation device and in situations where compass system 10 could not necessarily be kept in a level attitude.

Compass system 10 is contained in a small waterproof housing 18 that may be depth rated to about 200 feet in salt water and has a mounting mechanism 20 that can exert a clamping engaging force on a part 22 of hardware 12 to hold or position housing 18 of compass system 10 in a portion of (or at a desired location in) the forward field of view of operator 16. Mounting mechanism 20 can be a resilient structure that clamps onto part 22 (that may be flat, protrude, or be rim-like) and/or can include a screw 24 or the like that can be tightened to assure that mounting mechanism 20 securely engages part 22. Other fasteners for mounting mechanism 20 for attachment onto or engagement with part 22 may include mating snaps, multiple screws, Velcro strips, clips, suction devices, adhesives, or elastic/flexible straps with a bracket or adaptor for engagement. Another mounting scheme would allow compass system 10 to be manually pivoted out of the field of view of operator 16 (while still being mounted to the head) in situations where the data was not needed.

Mounting mechanism 20 allows for attachment and adjustable location of compass system 10 at a desired position in front of the eyes 17 of operator 16 for real-time observation of compass data images 11. This capability assures that operator 16 will clearly see a virtual image of compass data focused at a comfortable viewing distance by simply shifting the operator's view to focus on other parts of compass system 10 to be described.

Compass system 10 has an optically clear shim 26 located between view port lens 14 and other components of system 10. Optically clear shim 26 is used as a filler element to prevent obscurants from the environment from blocking the optical path of compass data images 11 from system 10 to eyes 17, and shim 26 presents compass data images 11 at the desired position and angle in front of the operator's eyes 17 for unimpaired vision.

Referring also to FIG. 2, waterproof housing 18 of compass system 10 contains a miniature electronic, two-axis, magnetic field sensor module 28 which provides magnetic field data signals (shown as arrow 30) over electrical cable 31 for compass system 10. Magnetic field data signals 30 are indicative or representative of the direction faced by operator 16. A typical, commercially available off the shelf two-axis magnetic field sensor module that can be used for magnetic field sensor module 28 is known as the PNI MicroMag 2-axis Magnetic Sensor Module Part Number 11594 manufactured by PNI Corporation of 5464 Skylane Blvd., Suite A, Santa Rosa, Calif. 95403.

Magnetic field sensor module 28 is mounted on a two-axis gimbal mechanism 32 in waterproof housing 18 to allow a wide range of movement by operator 16 without degrading the accuracy of magnetic field sensor module 28. Two-axis gimbal mechanism 32 can be a scaled-down version of many well known mechanically gimbaled and damped self-leveling systems. These leveling systems create damped, substantially level platforms for instrumentations, and typically, they are used as the supports for ships' compasses to dampen motions from them, or they may be for gyros or other applications where such supports are needed. See for example U.S. Pat. No. 4,318,522.

Two-axis gimbal mechanism 32 could be like the gimbal of prior art shown in FIG. 1 of the '522 patent and could provide the requisite leveling and yaw detection capabilities for magnetic field sensor module 28 by miniaturizing the structure of FIG. 1 and substituting magnetic field sensing module 28 for the object that looks like a rolling-pin. Miniaturization of such a self leveling system to meet the size constraints of compass system 10 is within the scope of one skilled in the art without calling for anything more than the exercise of ordinary skill and does not require undue experimentation.

Figures 3, 4:
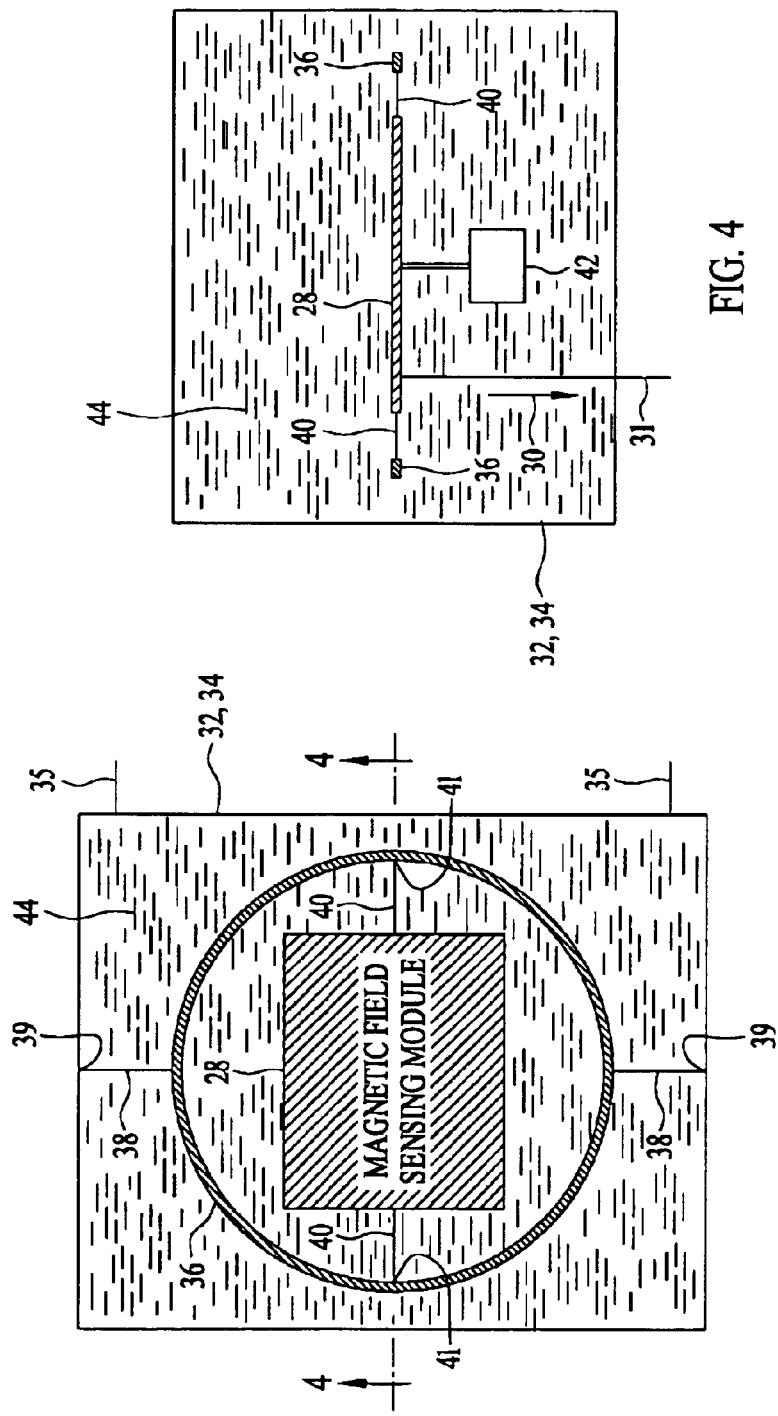
FIG. 3 is a schematic cross-sectional top view of a two-axis damped mechanical gimbal mechanism supporting a magnetic field sensing module taken generally along line 3—3 in FIG. 2.
FIG. 4 is a schematic cross-sectional side view of a two-axis damped mechanical gimbal mechanism supporting a magnetic field sensing module taken generally along line 4—4 in FIG. 3.

Referring also to FIGS. 3 and 4, magnetic field sensor module 28 is mounted in a protective housing 34 of gimbal mechanism 32 via a ring structure 36 coupled to two orthogonal axis structures 38 and 40 of gimbal mechanism 32. Pivot points 39 are at opposite ends of axis structure 38 to allow rolling motions of magnetic field sensor module 28, and pivot points 41 are at opposite ends of axis structure 40 to allow pitching motions of magnetic field sensor module 28. Thus, magnetic field sensor module 28 always stays substantially level regardless of the pitch and roll of compass module 10 during movement of operator 16. A ballasting counterweight 42 is connected to the bottom of magnetic field sensor module 28. Counterweight 42 hangs on rigid attachment from module 28 and helps keep module 28 level and prevent oscillations of module 28 by the operator's pitching and rolling motions. Protective, sealed housing 34 can be filled with an oil-like non-reactive fluid 44 to dampen the movement of magnetic field sensor module 28 so that it does not oscillate as movements are made by operator 16. These features allow operator 16 a wide range of pitch and roll motion without degrading the accuracy of magnetic field sensor module 28 of compass system 10.

Protective housing 34 is connected at points 35 to waterproof housing 18 (only two of which are depicted in FIG. 2), and housing 18 is coupled to head mounted hardware 12 by mounting mechanism 20. Consequently, any horizontal yawing motions of operator 16 are transmitted to gimbal mechanism 32 and magnetic field sensor module 28 so that the relative directions operator 16 is facing can be sensed as magnetic field data signals 30 and indicated as responsive compass data images 11 at view port lens 14. This is because yawing motions in the horizontal plane by operator 16 are not compensated for by gimbal mechanism 32. Thus, magnetic field sensor module 28 is able to sense rotational motion and different directional headings or facings of operator 16 as operator 16 turns left or right (yawing motion), and magnetic field sensor module 28 responsively generates directional magnetic field data signals 30 that can be representative of what direction operator 16 faces in the horizontal plane during progression from one location to another.

A processor electronics module 46 is connected to magnetic field sensor module 28 via electrical cable 31 to receive magnetic field data signals 30. Processor electronics module 46 reads magnetic field data signals 30, makes calculations using previously stored calibration data to yield the compass heading (azimuth), and outputs this data as representative driving signals (shown as arrow 47) in the proper format for microdisplay 48 where it is displayed and illuminated by a display light 50 radiating light (shown as arrows 51) at a predetermined intensity for viewing by operator 16.

Many different types of commercially available microdisplays can be used as microdisplay 48 for presenting the data of compass data images 11. These include but are not limited to appropriately sized segmental, dot-matrix and active-matrix transmissive, transflective or reflective LCDs, LEDs and organic LEDs (OLEDs). Possible illumination sources for display light 50 can include electoluminescent (EL) and LED devices of the appropriate size, power and color that can be selected and installed in compass system 10 by one of ordinary skill.

An optical element 52 is aligned to receive illumination 51 through microdisplay 48. Optical element 52 can be a small single lens or system of compound lenses with a wide field of view capable of making a substantially right angled transmission of undistorted and focused compass data images 11 to eyes 17 of operator 16. Optical element 52 can be a free shaped prism or off-axis mirti-mirror optical system that are both well known in the state of the art for application with other commercial off the shelf head mounted display systems such as those made by Olympus (Eye-trek), IO-Display systems, and others. Typical of the many types of lens arrangements that could be used or modified for use as optical element 52 are in U.S. Pat. Nos. RE37,667, 6,373,645, and 6,317,267. Optically clear shim 26 can be mounted on an outside surface 54 of optical element 52 to block obscurants from the environment and transmit undistorted and focused compass data images 11 to eyes 17.

A switch 56 connected to processor electronics module 46 has a push-button 58 that extends through housing 18 to permit operator 16 to selectively turn-on or turn-off compass system 10 as desired. Button 58 of switch 56 is coupled to processor electronics module 46 that is connected to battery 60 for electrical power when operator 16 pushes button 58 to turn-on compass system 10. Processor module 46 also connects magnetic field sensing module 28 to battery 60 via electrical cable 31 to activate it when button 58 is displaced by operator 16.

In operation, operator 16 turns on compass system 10 by pushing push-button 58 of switch 56. The horizontal X and Y components of the earth's magnetic field are sensed by magnetic field sensor module 28 which is kept steady and level by being mounted on two-axis damped, mechanical gimbal mechanism 32. Magnetic field signals 30 are coupled to processor electronics module 46 which reads signals 30 and generates compass heading driving signals 47(in azimuth) based on previously stored calibration data. Processor electronics module 46 couples compass heading driving signals 47 in a suitable format to microdisplay 48 where it is displayed and illuminated by radiated light 51 from display light 50. The data image displayed by microdisplay passes through the optical element 52 where it is turns through a right angle and can be magnified for close eye viewing as compass data image 11 at outside surface 54. The magnified compass data image 11 passes thru optically clear shim 26, if used, through view port 14 and to eyes 17 of operator 16 for viewing.

At any time, the light level of the displayed magnified compass data image 11 can be adjusted manually to suit an individual operator's requirements by using pushing push button 58 of switch 56 in a predetermined sequence of actuation since display light 50 is coupled to switch 56 via processor electronics module 46. Similarly, operator 16 can optionally elect to calibrate the magnetic field sensor module 28 to account for local, static, magnetic field variations by inputting the correct switch input sequences to processor electronics module 46 via push button 58 of switch 56. If this selective option is elected, processor electronics module 46 is programmed, and/or preset to perform the necessary calibrations while operator 16 executes the required positioning sequences for magnetic field sensor module 28. When these calibrations are complete, processor electronics module 46 can store the calibration data in local memory for use during subsequent operations.

A further option with compass system 10 of the invention is that operator 16 can turn off compass system 10 with push button 58 of switch 56 or processor electronics module 46 can be preset or preprogrammed to put compass system 10 into a sleep-mode where power consumption is very low. The sleep-mode of operation may be called for when the correct conditions are met (e.g. during a period of non-use where no significant compass movement is determined by magnetic field sensor module 28).

Small head-mounted compass system 10 of the invention has an optical display system that can be externally mounted on a variety of existing head mounted hardware 12 to allow operator 16 to see real-time compass data images 11. These images are presented, via an illuminated magnifying optical element 52 at a preferred location in the operator's field of view. A damped, gimbaled, two-axis magnetic field sensor module 28 allows a wide range of operator movement without degrading compass accuracy. When used with dive masks, goggles or helmets that isolate the operator's eyes 17 from the ambient environment, compass system 10 of the invention allows operator 16 to view compass data images 11 regardless of ambient visual environmental conditions (i.e. darkness, turbid water, smoke, fog, and any other opaque obscurants) without the use of the arms or hands, and without undue obstruction of the field of view of operator 16. When used stand-alone, (not in conjunction with protective equipment that isolates the operator's eyes from the ambient environment), operator 16 will be able to view compass data images 11 on compass system 10 regardless of ambient lighting conditions provided that any significant obscurants do not get between the operator's eyes and compass data images 11 emitted from compass system 10.

Compass system 10 of the invention is small, self-contained, waterproof and ruggedized to allow its placement in various positions in an operator's field of view depending on viewing requirements to allow operator 16 to see compass data images 11 in any environment. Compass system 10 of the invention can be used stand-alone with its own head mounted bracket or attached to existing head mounted hardware 12 or can also be used in a hand-held application by holding compass module 10 up to the eye.

Having the teachings of this invention in mind, modifications and alternate embodiments of compass system 10 may be adapted without departing from the scope of the invention. Its uncomplicated, compact design that incorporates structures long proven to operate successfully lends itself to numerous modifications to permit its reliable use in hostile and demanding marine environments of impaired visibility both in and on open water and land. Compass system 10 can be made larger or smaller in different shapes and fabricated from a wide variety of materials to assure resistance to corrosion, sufficient strength, to bear up during routine abuse, and to provide long term reliable operation under a multitude of different operational conditions and requirements.

The disclosed components and their arrangements as disclosed herein, all contribute to the novel features of this invention. Compass system 10 provides a reliable and capable means of keeping personnel on course under conditions of impaired visibility to assure completion of assigned tasks irrespective of ambient conditions and terrain associated with hostile marine and land environments. Therefore, compass system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. A compass system to indicate direction faced comprising:
   a waterproof housing;
   a mounting mechanism on said housing to engage a part of a headgear worn by an operator and position said housing in a portion of the forward field of view of the operator;
   a two-axis gimbal mechanism inside said waterproof housing, said two-axis gimbal mechanism having a protective housing connected to said waterproof housing, said protective housing containing ring structure and two orthogonal axis structures;
   a magnetic field sensor module mounted on one of said axis structures, said magnetic field sensor module providing magnetic field data signals representative of the direction faced by the operator; and
   an optical element having a wide field of view to transmit compass
   data images representative of said magnetic field data signals to the eyes of the operator.

2. The compass system of claim 1 wherein said mounting mechanism transmits horizontal yawing motions of the operator to said gimbal mechanism and said magnetic field sensor module.

3. The compass system of claim 2 further comprising:
   a processor electronics module connected to said magnetic field sensor module to receive said magnetic field data signals, said processor electronics module reading said magnetic field data signals and creating representative driving signals; and
   a microdisplay connected to said processor electronics module for displaying said driving signals.

4. The compass system of claim 3 further comprising:
   a display light inside of said waterproof housing radiating light through said microdisplay, said optical element being aligned to receive illumination from said microdisplay and transmit said compass data images for viewing by the operator.

5. The compass system of claim 4 wherein said display light can radiate
   light onto said microdisplay and transmit said compass data images for viewing by the operator.

6. The compass system of claim 5 further comprising:
   an optically clear shim on said optical element next to a view port on said headgear to prevent obscurants from the environment from blocking the optical path of said compass data images.

7. The compass system of claim 6 further comprising:
   a battery for supplying electrical power in said waterproof housing; and
   a switch in said protective housing having a push-button extending
   through said waterproof housing, said push button connecting said processor electronics module to said battery to turn-on said compass system.

8. The compass system of claim 7 wherein light intensity of said display light and said compass data image can be adjusted by pushing said push button of said switch in a predetermined sequence.

9. The compass system of claim 8 wherein said magnetic field sensor module is calibrated to account for local, static, magnetic field variations by inputting sequences to said processor electronics module via said push button of said switch.

10. The compass system of claim 9 wherein said push button of said switch can turn off said processor electronics module after a period of time when no significant motion of magnetic field sensor module is determined.

11. The compass system of claim 10 further comprising:
    a counterweight connected to the bottom of said magnetic field sensor module; and
    a fluid filling said protective housing around said magnetic field sensor module.

12. The compass system of claim 11 wherein said counterweight hangs on rigid attachment from said magnetic field sensor module to help keep it level and prevent oscillations by the operator's pitching and rolling motions, and said fluid dampens movement of said magnetic field sensor module to allow the operator a wide range of pitch and roll motion without degrading the accuracy of said magnetic field sensor module.

13. A head mounted compass system comprising:
    means for providing a waterproof housing;
    means for engaging a headgear worn by an operator, said engaging means being mounted on said waterproof housing providing means to hold said housing in a portion of the forward field of view of the operator;
    means for securing a two-axis gimbal mechanism inside said waterproof housing providing means, said two-axis gimbal mechanism creating means having a protective housing connected to said waterproof housing providing means, said protective housing containing ring structure and two orthogonal axis structures;
    a means for sensing magnetic fields mounted on one of said axis structures, said magnetic field sensing means providing magnetic field data signals representative of the direction faced by the operator; and
    means for transmitting compass data images representative of said magnetic field data signals to the eyes of the operator, said transmitting means having a wide field of view to transmit said compass data images.

14. The compass system of claim 13 wherein said protective housing is connected to said waterproof housing providing means and said waterproof housing providing means is coupled to said headgear by said engaging means to transmit horizontal yawing motions of the operator to said two-axis gimbal mechanism creating means and said magnetic field sensing means.

15. A method of sensing direction faced by an operator comprising the steps of:
    providing a waterproof housing;
    engaging a headgear worn by an operator by a mounting mechanism on
    said waterproof housing to position said housing in a portion of the forward field of view of the operator;
    securing a two-axis gimbal mechanism inside said waterproof housing, said two-axis gimbal mechanism having a protective housing connected to said waterproof housing, said protective housing containing ring structure and two orthogonal axis structures;
    sensing magnetic fields representative of the direction faced by the operator by a magnetic field sensor module mounted on one of said axis structures, said magnetic field sensor module providing magnetic field data signals representative of the direction faced by the operator; and
    transmitting compass data images representative of said magnetic field data signals to the eyes of the operator, said compass data images being over a wide field of view.

* * * * *